(No Model.)
R. J. CHRISTY.
KNIFE.
No. 519,237.　　　　　　　　　　Patented May 1, 1894.
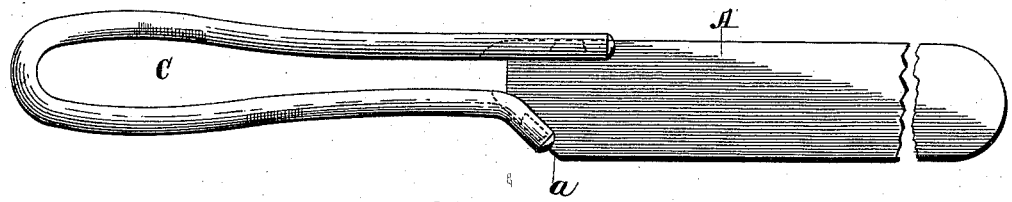
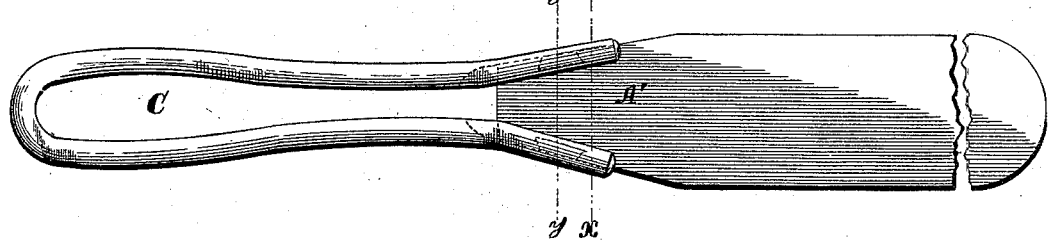
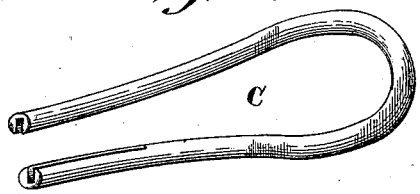
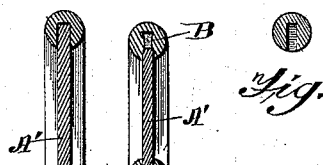
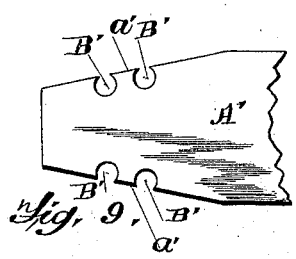
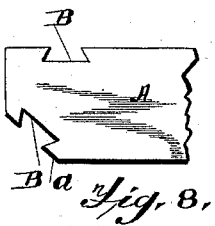
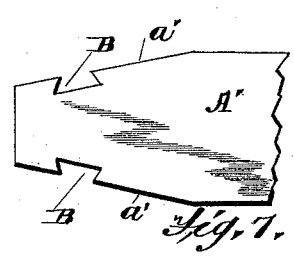
Witnesses　　　　　　　　　　　　Inventor
　　　　　　　　　　　　　　　　Russ J. Christy
　　　　　　　　　　　　　　By　W. A. Bartlett
　　　　　　　　　　　　　　　　Attorney
THE NATIONAL LITHOGRAPHING COMPANY,
WASHINGTON, D. C.

UNITED STATES PATENT OFFICE.

RUSS J. CHRISTY, OF FREMONT, OHIO.

KNIFE.

SPECIFICATION forming part of Letters Patent No. 519,237, dated May 1, 1894.

Application filed April 18, 1893. Serial No. 470,814. (No model.)

*To all whom it may concern:*

Be it known that I, RUSS J. CHRISTY, residing at Fremont, in the county of Sandusky and State of Ohio, have invented certain new and useful Improvements in Spatulas, Knives, &c., of which the following is a specification, reference being had therein to the accompanying drawings.

This invention relates to knives, such as druggists' spatulas, paint and putty knives, kitchen and table knives, and the handles thereof.

The object of the invention is to produce a knife with a shankless blade, and a wire or similar drawn metal handle, in which the handle and blade shall be firmly and neatly secured together.

Figure 1 is a plan of a knife and handle, showing the bevel of the blade and bend of the handle mainly on one side, as for kitchen and table knives. Fig. 2 is a plan of a spatula with the bevel of blade on both sides, and handle centrally attached. Fig. 3 is a perspective of handle, Fig. 2. Fig. 4 is a section of handle on line $z$—$z$ Fig. 3. Figs. 5 and 6 are sections of the tool, on lines $x$—$x$ and $y$—$y$, Fig. 2. Figs. 7, 8, and 9 are broken views of different blades.

The knife blade is preferably of steel, and has about the usual taper of knife blades for similar purposes. The blade A, Figs. 1 and 8, has the corner $a$ cut away, and the notches B are formed into the edge of the blade, near the end where the handle is to be attached.
These notches are preferably dovetailed, but may be of other form.

In Figs. 2, 7, and 9, the blade A' has both corners $a'$ cut away, and along the oblique edge notches B or B' are cut, bored, or otherwise formed.

The knife handle C is made from a piece of wire or other drawn metal. The piece constituting the handle is bent or bowed to shape, and the inner sides of the bow are slotted or grooved longitudinally near the ends. The grooves can be formed before or after the bending of the handle.

As shown in Figs. 1, 2, and 3, the ends of the bowed handle are bent to approximate the form of the end of the knife. The notched end of the blade is slipped into the grooved end of the handle, and by a blow or pressure the handle is compressed, so that the metal of the handle closes into the holes or notches B or B' of the blade. (See Fig. 5.) The natural tendency of the handle is to close onto the blade. The groove in the handle is made to closely fit the blade. The blade generally tapers toward the point. Consequently the handle may be quite firmly secured to the blade by pressure, even if the notches B be omitted. But when these notches are employed, and the metal of the handle pressed into the notches, the attachment of parts is exceedingly strong.

The ends of the wire forming the handle are preferably rounded, to give a neat finish. The wire may be cylindrical, oval, or of other suitable and usual form. For cheapness of construction the wire will generally be of uniform cross section, but this is not essential. Steel wire may be used to advantage, or some of the alloys. The knife may be plated, with nickel, silver, or other metal. Preferably the plating is done after the blade and handle are permanently attached.

The wire or drawn metal of the handle gives great strength and toughness to the handle. The blade, being cut from a rolled plate of suitable thickness and taper, can be cheaply made, and is susceptible of a better temper and finish than if it had a thickened shank.

As there is no tang formed on the blade by cutting away portions at a right angle to the edge, or nearly so, as is common in knives, the portion of the blade grasped by the handle is of practically the full strength of the blade, and there is no tendency to break off where the blade proper ends and tang begins, as is the case in many forms of knives known in the art.

What I claim is—

1. The combination of the shankless knife blade having notched edges, one being oblique, of the bent wire handle having an oblique end grooved to embrace said notched portion of the blade, and compressed to the blade, substantially as described.

2. The knife or spatula having oblique edges with dovetailed notches therein, and the wire handle having obliquely bent ends, said handle having grooves embracing the edges of the blade and compressed into said notches, substantially as described.

In testimony whereof I affix my signature in presence of two witnesses.

RUSS J. CHRISTY.

Witnesses:
BIRT S. GARVER,
M. M. BARRINGER.